US 6,948,119 B1

United States Patent
Farmer et al.

(10) Patent No.: US 6,948,119 B1
(45) Date of Patent: Sep. 20, 2005

(54) AUTOMATED PARAGRAPH LAYOUT

(75) Inventors: John L. Farmer, Santa Maria, CA (US); Matthew A. Wormley, San Luis Obispo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 957 days.

(21) Appl. No.: 09/670,761

(22) Filed: Sep. 27, 2000

(51) Int. Cl.⁷ .............................................. G06F 17/21
(52) U.S. Cl. ...................... 715/517; 715/518; 715/521
(58) Field of Search ............................... 715/517, 518, 715/519, 520, 521, 527, 531, 542

(56) References Cited

U.S. PATENT DOCUMENTS

| | | | |
|---|---|---|---|
| 5,625,773 A * | 4/1997 | Bespalko et al. ............ 345/467 |
| 5,956,737 A | 9/1999 | King et al. | |
| 6,032,163 A | 2/2000 | Tou et al. | |
| 6,223,191 B1 * | 4/2001 | Truelson ..................... 715/517 |
| 6,288,726 B1 * | 9/2001 | Ballard ....................... 345/468 |
| 6,321,243 B1 * | 11/2001 | Ballard ....................... 715/517 |
| 6,510,441 B1 * | 1/2003 | Kenninga .................... 715/521 |
| 6,647,533 B1 * | 11/2003 | Liu et al. .................... 715/517 |
| 6,766,495 B1 * | 7/2004 | Bates et al. ................. 715/531 |

OTHER PUBLICATIONS

Microsoft, "Microsoft Word 2000," 1999, Screen Shots pp. 1-7.*

Hirschberg et al., *Journal of the Association for Computing Machinery*, 1987, 34(3):616-625.

Knuth et al., *Software—Practice and Experience*, 1981, 11:1119-1184.

* cited by examiner

Primary Examiner—Stephen Hong
Assistant Examiner—Adam L. Basehoar
(74) Attorney, Agent, or Firm—Fish & Richardson P.C.

(57) ABSTRACT

A technique for automated paragraph layout identifies possible lines within a paragraph in a top-down pass through the paragraph, selects a combination of the possible lines in a bottom-up pass through the paragraph, and specifies a layout for the paragraph within a page according to the selected combination.

42 Claims, 5 Drawing Sheets

AUTOMATED PARAGRAPH LAYOUT

BACKGROUND

The invention relates to automated paragraph layout.

Paragraph layout in a document production application involves selection and placement of line breaks to produce a visually pleasing appearance within a paragraph cell that defines the space allotted for the paragraph. Changes in the style of the text, e.g., fonts, formats, line heights, and point size, can complicate the task, particularly when layout is performed within arbitrary shapes. In particular, paragraph cells with arbitrary shapes can produce baselines that vary in width. Text style changes and shape complexity can significantly increase computational overhead and processing time.

A number of techniques exist for automated paragraph layout. Many involve the formulation of a search tree structure representing all possible line combinations for a given paragraph. This type of technique assigns a penalty value to each possible line, and picks a path through the tree with the lowest accrued penalty. Although this technique is generally effective, it is very time- and memory-intensive. Extensive use of system resources and protracted processing time is generally undesirable in document production, especially in light of the increasing complexities of document content.

Other techniques make use of dynamic programming and failure functions to create algorithms that run in linear time. Dynamic programming techniques generally are less memory-intensive and very quick. Complex shapes can undermine the effectiveness of such techniques, however, limiting their general application to paragraph layout. In particular, some dynamic programming techniques are inapplicable for shapes that deviate from a constant baseline width.

SUMMARY

The invention is directed to a system, method, and computer-readable medium for automated paragraph layout.

In one embodiment, the invention identifies possible lines within a paragraph in a top-down pass through the paragraph, selects a combination of the possible lines in a bottom-up pass through the possible lines, and specifies a layout for the paragraph according to the selected combination.

In another embodiment, the invention defines a paragraph layout for a paragraph of text, detects a change to the paragraph of text, wherein the change includes at least one of a change to the text and a change to a paragraph cell in which the text is positioned, and globally redefines the paragraph layout in real time in response to the detected change.

In an additional embodiment, the invention compiles sequences of possible lines within a paragraph for generation of a paragraph layout, calculates a penalty for each of the possible lines, accrues the penalties calculated for each of the possible lines in each of the sequences in the course of compiling the sequences, compares each of the accrued penalties to a benchmark penalty corresponding to a known, complete paragraph layout, and when the accrued penalty for one of the sequences does not satisfy the benchmark penalty, terminates further compilation of the respective sequence.

In a further embodiment, the invention builds a complete paragraph layout solution by expanding partial paragraph layout solutions, compares a penalty for each of the partial paragraph layout solutions to a benchmark penalty corresponding to a known, complete paragraph layout solution, and in the event the penalty for one of the partial paragraph layout solutions does not satisfy the benchmark penalty, terminates further expansion of the respective partial paragraph layout solution.

The invention can be implemented to realize one or more of the following advantages. The invention may be capable of producing paragraph layouts within complex and arbitrary shapes with high speed and moderate use of computing resources, enabling rendering of paragraph layouts in real time for dynamic changes in paragraph text, imagery, and shape. For example, the invention can provide paragraph layouts for paragraph cells characterized by varying baseline widths, multiple baselines within a single line of text, and varying font sizes. In addition, the invention can readily accommodate flow of text among multiple paragraph cells having arbitrary, changing shapes.

A top-down pass may include a pruning operation that greatly reduces the size of the solution set for a bottom-up pass. In particular, partial paragraph layout solutions can be compared to a known complete solution, and eliminated from further consideration if they do not satisfy a benchmark penalty calculated for the known solution. Expansion of partial solutions that exceed the benchmark penalty thereby can be avoided. In this manner, a subset of the possible lines can be identified in the top-down pass through the paragraph. In the bottom-up pass, the combination of possible lines is selected from only the identified subset.

With one or more of the above features, the overall processing time and memory consumption required by the two-pass technique of the invention can be significantly reduced. The invention thereby supports rendering of optimal paragraph layout solutions on a global basis for a given paragraph, taking into account all lines in the paragraph, even though the user may enter only local changes to the text, imagery or paragraph. As a result, graphic artists and other users of the invention can experience optimal rendering of global paragraph layout solutions in real time.

The details of one or more embodiments of the present invention are set forth in the accompanying drawings and the description below. Other features, objects, and advantages of the present invention will be apparent from the description and drawings, and from the claims.

DETAILED DESCRIPTION

Figure 1:
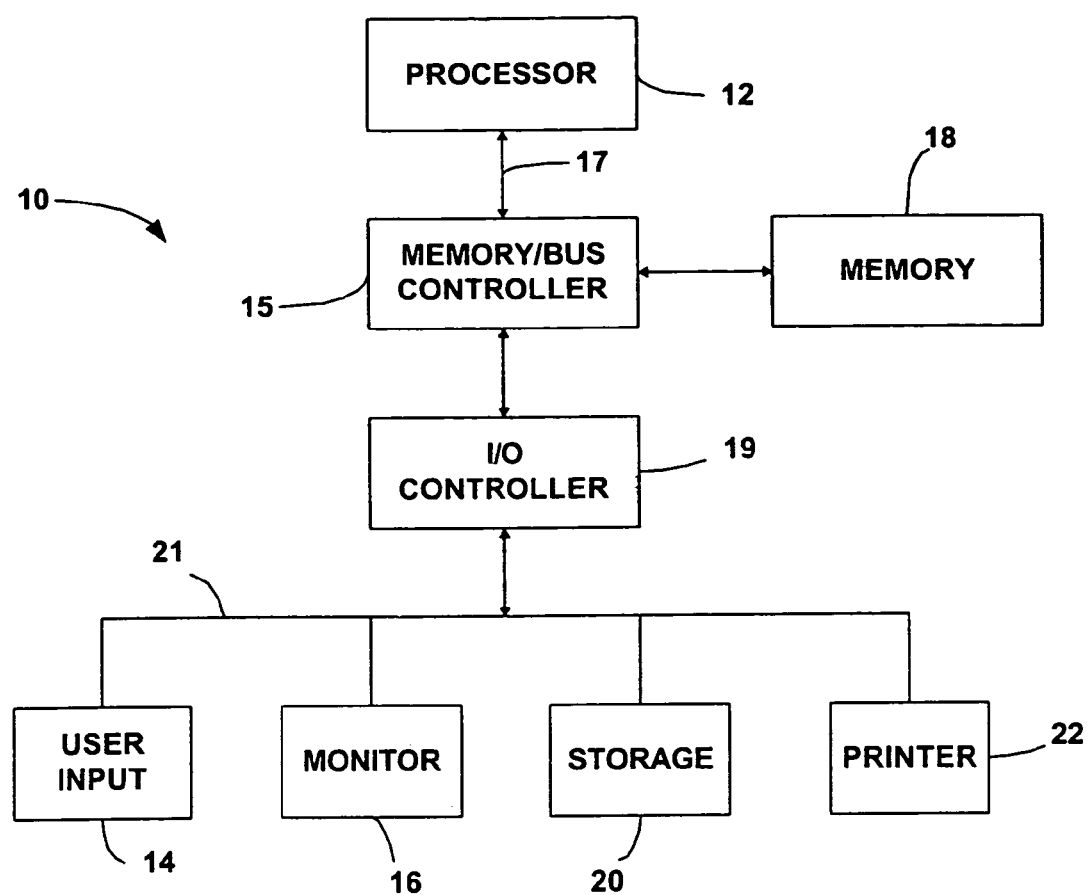
FIG. 1 is a block diagram illustrating a system suitable for implementation of techniques for automated paragraph layout.

FIG. 1 is a block diagram illustrating a system 10 suitable for implementation of techniques for automated paragraph layout. As shown in FIG. 1, system 10 may include a processor 12, user input device 14, display monitor 16, memory 18, storage device 20, and printer 22. System 10 may substantially conform to conventional systems used by graphic artists and other users in the creation of textual and graphic imagery for electronic display or print reproduction. A memory/bus controller 15 and system bus 17 couple processor 12 and memory 18, while one or more I/O controllers 19 and I/O bus 21 couple the processor and memory to user input device 14, display monitor 16, storage device 20, and printer 22.

Processor 12 may take the form of a general purpose microprocessor and can be integrated with or form part of a PC, Macintosh, or computer workstation. User input device 14 may include a conventional keyboard and pointing device such as a mouse, pen, or trackball, if desired. Monitor 16 may include a CRT, flat panel display, or the like, that displays textual and/or graphic information to the user. Memory 18 may include random access memory (RAM) storing program code that is accessed and executed by processor 12 to carry out techniques for automated paragraph layout.

The program code can be loaded into memory 18 from storage device 20, which may take the form of a fixed hard drive or removable media drive associated with system 10. For example, the program code can be initially carried on computer-readable media such as magnetic, optical, magneto-optic or other disk or tape media. Alternatively, the program code may be loaded into memory 18 from electronic computer-readable media such as EEPROM, or downloaded over a network connection. The program code may be embodied as a feature in an application program providing a wide range of page layout and content authoring functionality.

Figure 2:
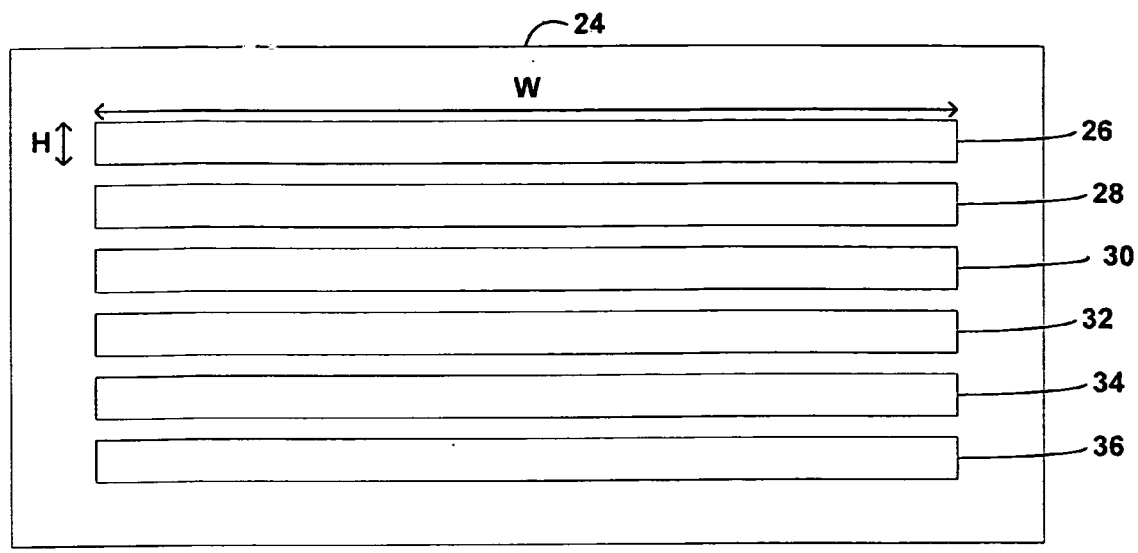
FIG. 2 is a diagram illustrating a series of constant-width baselines for paragraph layout.

FIG. 2 is a diagram illustrating a series of constant-width baselines for paragraph layout. As shown in FIG. 2, a paragraph cell 24 may take the form of an arbitrary shape that defines a sequence of baselines 26, 28, 30, 32, 34, 36 for entry of text. Paragraph cell 24 may be positioned within a page of imagery, e.g., for print reproduction such as on paper or film or electronic presentation such as via a web page. Each baseline 26, 28, 30, 32, 34, 36 extends horizontally across paragraph cell 24. The sequence of baselines 26, 28, 30, 32, 34, 36 extends vertically downward through paragraph cell 24. For some languages, text may extend in different directions. Therefore, the direction of text flow within baselines 26, 28, 30, 32, 34, 36 may differ from that described in this example. Also, in some applications, the text may flow between two or more cells. In this case, the paragraph layout technique tracks the widths of baselines within the cells, and renders a global paragraph layout solution for the entire body of text.

Each baseline 26, 28, 30, 32, 34, 36 defines an area for placement of textual information, and has a finite height H and length W. In general, baseline is a horizontal rectangle that describes a position for layout of a line of text, measured from the top of the paragraph cell. It is possible for a single word in a paragraph to start possible lines at more than one baseline. For example, depending on how preceding lines are broken, a given word may start a given baseline or the next baseline. This particularly may be the case when there are multiple baselines for a single line of text, e.g., when placement of a graphic object within the text divides a line into left and right baselines. The widths of baselines 26, 28, 30, 32, 34, 36 will vary according to their positions within a paragraph cell. In addition, when a user reconfigures the shape of paragraph cell 24, e.g., by scaling, the widths of the baselines and their organization within the cell may vary.

Figure 3:
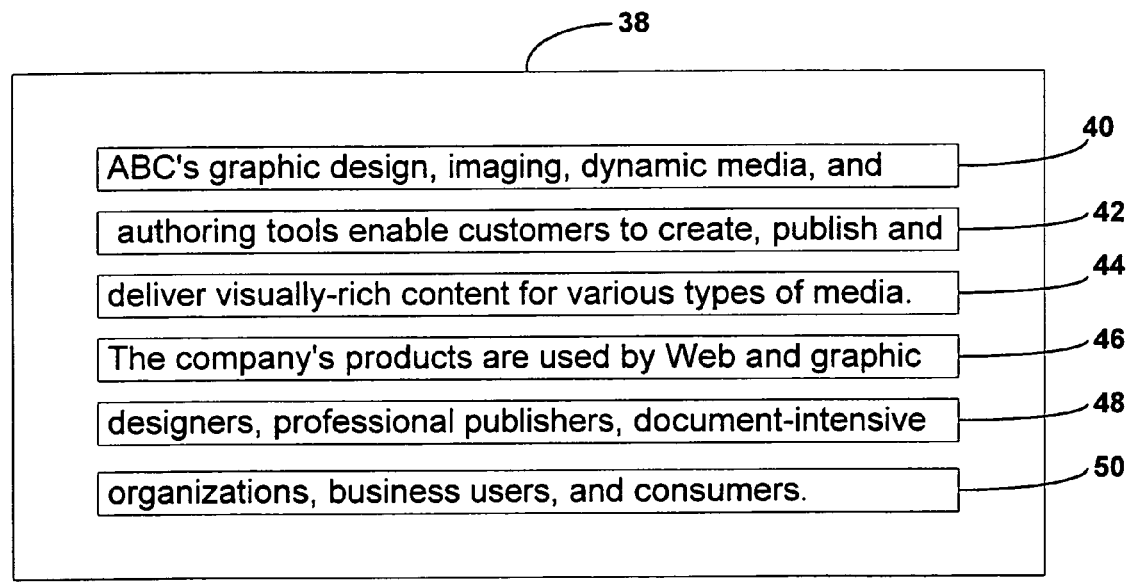
FIG. 3 is a diagram illustrating incorporation of text within the baselines shown in FIG. 2 according to a possible paragraph layout.

FIG. 3 is a diagram illustrating incorporation of text within a series of baselines 40, 42, 44, 46, 48, 50 as shown in FIG. 2 according to a possible paragraph layout within a paragraph cell 38. In the examples of FIGS. 2 and 3, each baseline has a common, constant width. Therefore, each line of text has the same maximum width when considering paragraph layout. The key to automated paragraph layout is establishing rules for breaking a line and starting the next line to produce an optimal layout. The rules must take into account the width of the available baselines, the width and other physical characteristics of the line of text, and penalty functions designed to promote a visually pleasing layout.

As mentioned above, the size of cell 24 and the size, number, and organization of the baselines can be varied dynamically by the user directly or indirectly in the course of page or cell layout. An example of a direct change to the size of cell 24 is the dragging of a handle on the cell to resize it. An example of an indirect change to the size of cell 24 might occur when a window containing the cell is resized, resulting in resizing of cell 24 on the monitor viewed by the user. In addition, the user may dynamically add, delete, or modify the text within cell 24 as well as add, delete, or modify non-text imagery, all in real time. To that end, the paragraph layout technique is capable of adapting to such dynamic changes, and rendering a globally optimal paragraph layout with the appearance of real-time responsiveness. Thus, when a change to a paragraph of text is detected, e.g., a change to the text or a change to the paragraph cell, the paragraph layout is globally redefined in response to the detected change.

Figure 4:
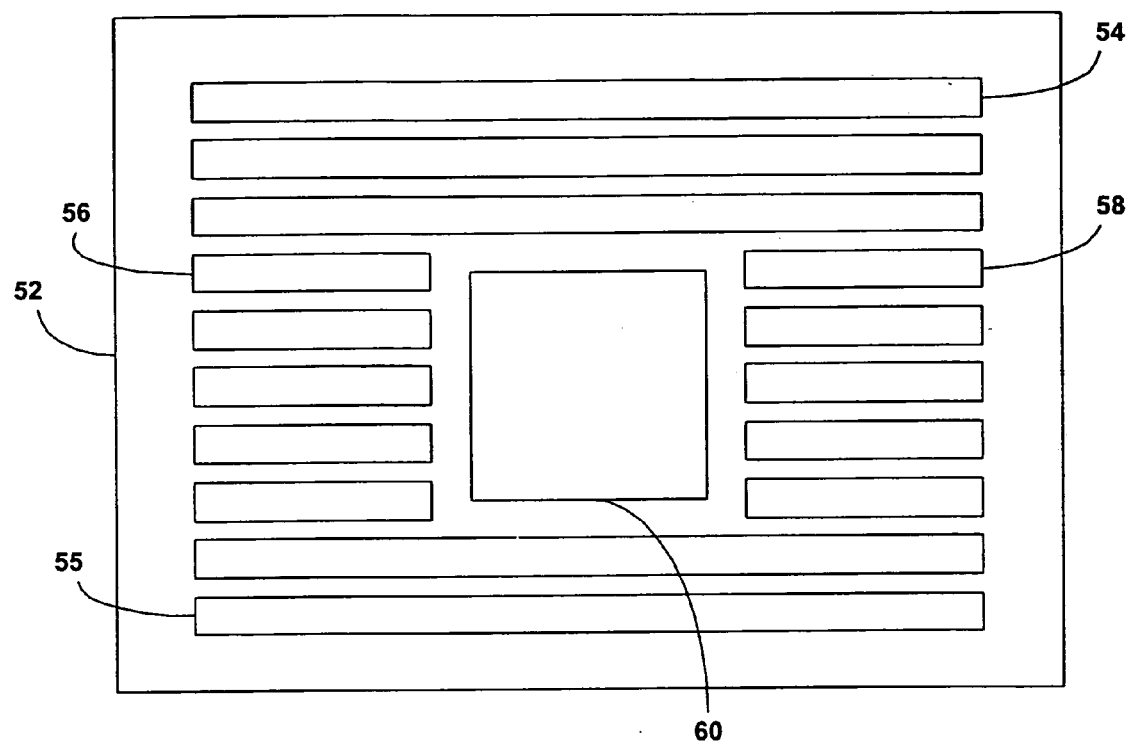
FIG. 4 is a diagram illustrating a series of varied-width baselines disposed for paragraph layout about an island.

With constant-width baselines, paragraph layout is somewhat straightforward and predictable. When a paragraph cell contains varied-width baselines and dynamic changes, however, the complexity of the problem can increase. In addition, some paragraph layout techniques do not handle varied-width baselines well, and require excessive processing time and memory resources. FIG. 4 is a diagram illustrating a paragraph cell 52 with a series of varied-width baselines disposed for paragraph layout about an island 60. As described above, paragraph cell 52 may have an arbitrary shape that can be dynamically changed either directly or indirectly by the user in real time. As another characteristic, paragraph cell 52 may be bounded on all sides. In the case of a rectangle, for example, paragraph cell 52 may have four known sides: top, left, right, bottom. For a more complex shape, paragraph cell 52 may have a known (but resizable and reconfigurable) boundary. In the example of FIG. 4, a number of baselines, e.g., baselines 54, 55, have common widths. Some baselines, e.g., baselines 56, 58, may differ in width from the other baselines, however, due to their proximity to island 60. In each case, the widths of all baselines can be calculated by reference to the known boundaries of paragraph cell 52 at a given time.

Island 60 defines an area that precludes placement of text, and thereby breaks adjacent baselines into multiple baselines. For example, island 60 may define an area for placement of a photograph, table, or graph, or alternative textual or graphic information. As a simple example, a magazine publisher may wish to place a picture between two areas of text. Island 60 is placed within the flow of the paragraph, creating multiple baselines, such as baselines 56, 58, that occupy the same height within paragraph cell 52. In this example, the text flows to the left and right of island 60, creating a left baseline 56 and right baseline 58 for each line of text. A continuous line of text is broken into segments that are placed in left baseline 56 and right baseline 58, respectively.

Figure 5:
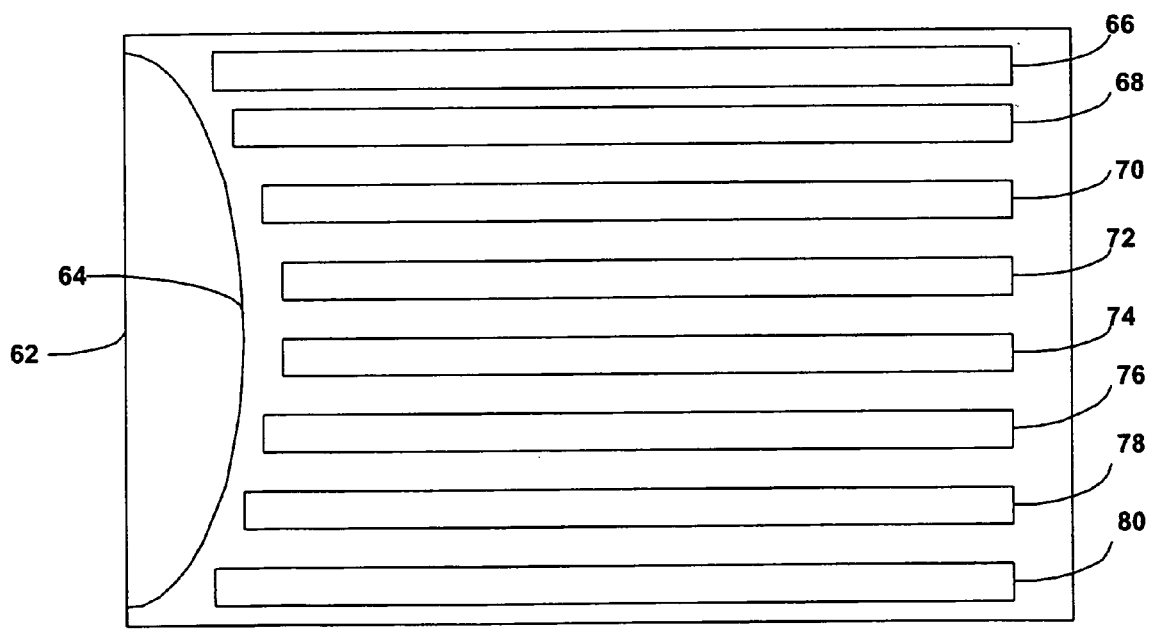
FIG. 5 is a diagram illustrating a series of varied-width baselines disposed for paragraph layout adjacent a varied-width margin.

FIG. 5 is a diagram illustrating a paragraph cell 62 with a series of varied-width baselines disposed for paragraph layout adjacent a varied-width margin 64. Paragraph cell 62 is another example of a paragraph cell presenting varied-width baselines. In the example of FIG. 5, a series of baselines 66, 68, 70, 72, 74 76, 78, 80 have widths that vary according to the width of margin 64. In FIG. 5, the edge of margin 64 is arcuate and, like island 60 in FIG. 4, defines an area for placement of alternative imagery such as non-text. The varying width of margin 64 means that baselines 66, 68, 70, 72, 74, 76, 78, 80 are each sized to accommodate varied maximum widths of text. Thus, paragraph cell 62 presents another example that can complicate paragraph layout or prevent use of certain paragraph layout techniques.

Figure 6:
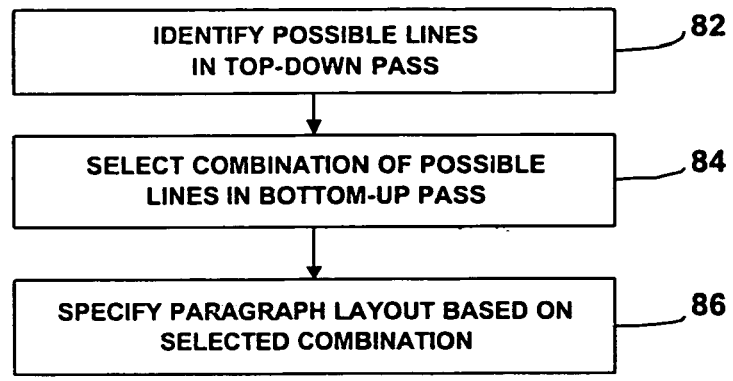
FIG. 6 is a flow diagram illustrating a technique for automated paragraph layout.

FIG. 6 is a flow diagram illustrating a technique for automated paragraph layout. In operation, processor 12 is programmed to execute a technique for automated paragraph layout. The technique involves identifying possible lines within a paragraph in a top-down pass through the paragraph (82), selecting a combination of the possible lines in a bottom-up pass through the possible lines (84), and specifying a layout for the paragraph according to the selected combination (86). The technique may involve calculating a penalty for each of the possible lines, and selecting the combination based on the penalty calculations.

In a top-down pass through the paragraph, the technique calculates penalties for each of the possible lines, and accrues the penalties over each downward sequence of possible lines. The top-down pass produces a sparse tree of possible paragraph layouts. The tree is sparse in the sense that not every possible combination of lines is represented in the tree. Instead, application of a per-line penalty function may eliminate a large number of possible combinations based on calculation of excessive penalties, as will be described.

In a bottom-up pass, the technique accrues penalties calculated in the top-down pass for each of the upward sequences of possible lines, and selects for the paragraph layout the combination of possible lines for which the accrued penalty in the bottom-up pass is lowest. By working upward, the bottom-up pass allows the optimal line combination below a given node in the tree to be determined. The penalty calculation for each of the possible lines may be based on the width of the respective line relative to the width of an applicable "baseline" within the page. Notably, the width of the applicable baseline may vary between different baselines.

Before selecting a combination of possible lines in the bottom-up pass, processor 12 may prune from the preliminary list assembled in the top-down pass, i.e., the sparse tree, the possible lines and sequences of possible lines for which the accrued penalty calculated in the top-down pass does not satisfy a benchmark penalty. This sparse tree provides the preliminary list of possible solutions. By pruning, the technique significantly reduces the number of possibilities in the list for consideration in the bottom-up pass, and thereby conserves processing and memory resources while reducing processing time. At the same time, the top-down pass produces a list of line-start possibilities that indicates which words can start lines and the pertinent baselines. The bottom-up pass then evaluates the line-start possibilities from the bottom of the paragraph upward to identify the optimal line combinations "so far" as it traverses the list.

In the bottom-up evaluation, the technique selects possible lines by examining each possible line-start and determining the optimal combination of line breaks from that line-start downward. In a one-hundred word paragraph, for example, the ninetieth word can determine the optimal possible set of line-breaks from itself to the last word in the paragraph. All words above the ninetieth word then can take advantage of the fact that a single optimal solution for word ninety to the end of the paragraph has already been found. There is no need to recalculate the optimal possible line breaks from word ninety to word one-hundred since it has already been done.

Thus, paragraph analysis according to the invention is performed in two passes. In the first pass, the text is examined starting at the beginning of the paragraph and moving downward. In this pass, text is examined to find possible lines into which the paragraph can be broken. This top-down pass takes into account the shapes that confine the paragraph and identifies where each line can fall in the paragraph. Hyphenated word breaks also can be considered during this top-down pass and penalized. The top-down pass determines possible line sequences, but, advantageously, need not track each combination of lines. Instead, it is only necessary to identify each possible line.

Again, the result of the top down pass is a simple list of line-start possibilities, where possible line-starts at successive baselines are linked to define a possible line. A series of links defines a downward sequence of the possible lines. The list indicates which words can start lines, and at which baselines the line-starts take place. The top-down pass starts at word one, baseline zero, and determines how many words will fit at that baseline given the known width of the baseline. The process identifies several possible line-breaks, and adds the resulting line-starts to the list.

The line-starts are those words that can start the very next line in the paragraph. Each line-start defines a possible line, but in a backwards fashion. Specifically, each line-start defines in part the content of the line that precedes it, because it determines the point at which the preceding line is broken to start the next line. The process involves determination of subsequent line-breaks for the new line-starts, and produces another set of new line-starts for the next baseline. The process continues until the end of the paragraph is reached, and the entire paragraph has been processed.

The bottom-up pass evaluates line sequences from the bottom of the paragraph upward, looking for the optimal combination of upward line sequences. Again, in the bottom-up pass, the process examines each possible line and determines the optimal combination of line breaks from that line downward. Using line-break information assembled in the top-down pass, the bottom-up pass can be extremely fast. Instead of evaluating every word as a possible line start, the bottom-up pass "knows" from the top-down pass exactly which words are potential line starts and can take advantage of that information to decrease overall processing time. In particular, the line-starts are already linked in the top-down pass, such that they only need to be followed upward in the bottom-up pass.

If the first word of a paragraph starts at word zero, for example, and during the top-down pass, acceptable line-breaks for the first baseline from word zero were words twenty, twenty-one, and twenty-two, there cannot be a second line that starts at any of words zero through nineteen. Specifically, the second line cannot start at any of words zero through nineteen because the very first acceptable line-break identified in the top-down pass is at word twenty. The use of this information can greatly accelerate the bottom-up process. Thus, a two-pass process requires an additional pass relative to other techniques, but can reduce overall processing time in generating a rational and visually pleasing paragraph layout within a pertinent paragraph cell.

Further reductions in the number of possible lines starts can be obtained by pruning line possibilities from the list assembled in the top-down pass. Pruning can be accomplished by comparing associated penalties to a "benchmark" penalty for a very simple paragraph layout routine. The benchmark penalty serves as a "sanity check." If the penalty from the top of the paragraph to the current line is worse than the benchmark, then additional lines stemming from the current line will only get worse in terms of penalty as the process continues. In this case, subsequent lines that result from expansion of the current line can be ignored.

Notably, this pruning is not a guess as a means of avoiding a "bad" decision, but rather a technique for removing possibilities that are known to be incapable of leading to an optimal solution. Moreover, the pruning feature permits comparison of partial line combinations to a known, complete solution. This enables further expansion of a partial solution to be avoided if it exceeds the penalty for the known, complete solution. From experience, the pruning feature frequently stops the evaluation of an entire paragraph after only evaluating a few lines, leading to the optimal solution in a short period of time.

Because the benchmark represents the penalty for a true paragraph layout, albeit a non-optimal layout, the pruning operation benefits from a known reference penalty. With this knowledge, the solution must be as least as good as the benchmark paragraph layout. Consequently, any possible line producing an accrued penalty that exceeds the benchmark is marked as irrelevant and discarded, as it will only lead to a less than optimal solution. As an example, the benchmark could be produced by a layout method that simply wraps text from line-to-line according to baseline width, and does not consider preceding or successive line combinations, much like the carriage return on an old-fashioned typewriter.

When the possible line is pruned from the solution set, it is done with the knowledge that it will not lead to a solution better than the benchmark. Once an accrued penalty exceeds the known benchmark, it cannot be found to be the optimal. If the process produces no better solutions, it will simply revert to the benchmark solution as the specified paragraph layout. The first time a layout is rendered for a paragraph of text, the benchmark penalty may be a known, non-optimal solution like the simple wrap-around layout described above. Once the automated paragraph technique of the invention renders a paragraph layout, however, its penalty advantageously may be used as the benchmark for subsequent layouts, e.g., for addition or deletion of text, so long as the cell or baselines do not change. When the pertinent paragraph cell changes in shape or size, or font changes or the like result in changes to the baselines, a simple wrap-around layout penalty can be used once again as the benchmark.

Comparison of possible lines defining partial paragraph layout solutions to the benchmark penalty for a complete paragraph layout in the top-down pass is markedly different from comparing intermediate line possibilities produced by the process to one another. Comparison of intermediate line possibilities to one another on a "peer-to-peer" basis may result in pruning of possible lines that could ultimately lead to a better solution. According to the invention, however, pruning is only performed relative to a known, complete solution—the benchmark. In addition, each possible line is compared to the same benchmark. In contrast, pruning by comparison of intermediate solutions relies on incomplete knowledge obtained as the evaluation proceeds through the paragraph, eliminating potentially good solutions in the process.

The top-down pass also can be configured to incorporate additional features such as 'widow' and 'orphan' control. Further, because the top-down pass permits immediate identification of the shape of the paragraph cell according to baseline width, the resulting information can be recorded for use in the bottom-up pass. While evaluating line possibilities in the bottom-up pass, the technique then can determine whether a possible line violates a widow or orphan preference. If so, the possible line can be discarded from the solution set, along with all possible lines linked to the discarded line, i.e., in a downward sequence of possible lines. In this manner, further expansion of the search tree along the pertinent sequence of possible lines can be avoided, terminating identification of additional possible lines in the downward sequence and conserving computing resources.

Importantly, whereas some paragraph layout techniques are constrained to paragraph cells having simple rectangular shapes, the top-down pass permits consideration of layout results for multiple font sizes and arbitrary shapes. The problem of multiple font sizes on a single line within an arbitrary shape is particularly troublesome in automated paragraph layout because increasing the font size increases the height of the line. The increased line height changes the vertical position of the line, which may in turn cause a change in line width. By changing the vertical position of a line, a single word in a different font size can cause completely different layout results in an arbitrary shape.

If an entire paragraph is set in a circle with 12 point text and 12 point leading, for example, the positions of the lines are predictable, i.e., a line begins every 12 points. If the size of a word is changed to 18 point, however, then any line that follows that word is pushed downward by an additional 6 points, introducing a completely different set of layout possibilities. Also, in a circle, the baseline width changes as the line moves upward or downward. By saving the baseline positions during the top-down pass, along with the possible line as defined by a line-start, the shape in which the line is positioned, and the hyphenation window, recalculations can be advantageously avoided during the bottom-up pass.

Figure 7:
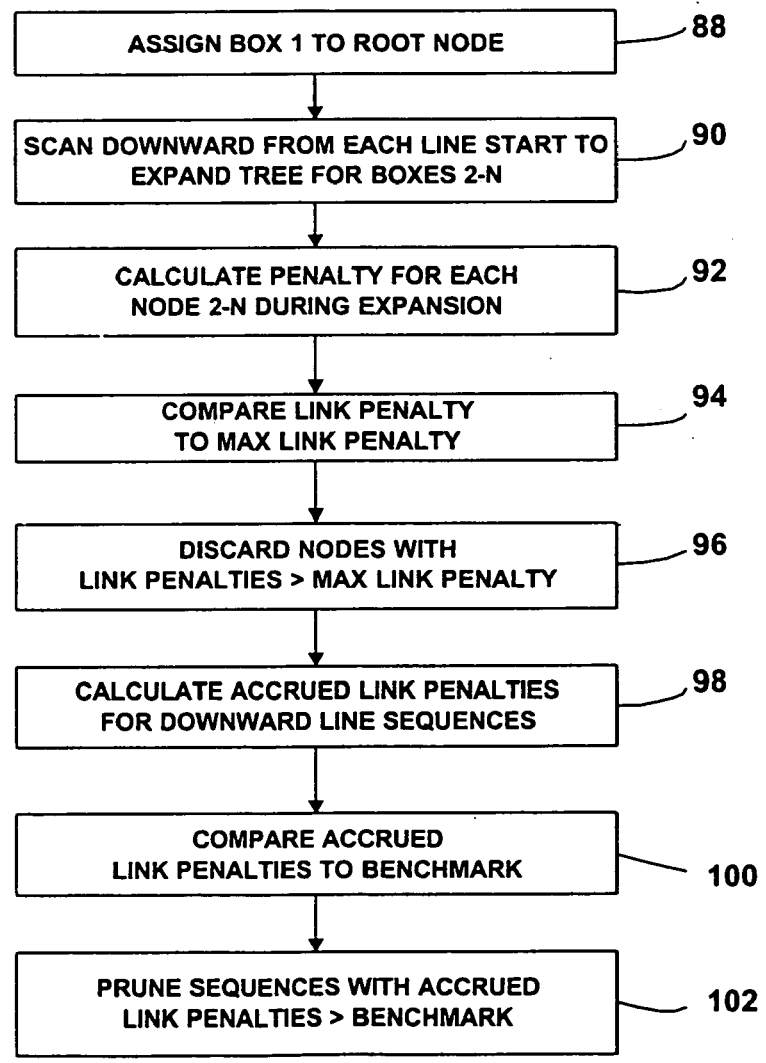
FIG. 7 is a flow diagram illustrating a top-down pass in the technique of FIG. 6.

FIG. 7 is a flow diagram illustrating a top-down pass in a technique as shown in FIG. 6. As shown in FIG. 7, in the top-down pass, the technique first assigns the first "box" to the root node of a search tree (88). A box may be a word, syllable, or character in the line of text that can support a break point to form a new line. Thus, the technique can permit hyphenation of words within a line. The first box is the first word, syllable, or character in the paragraph. Each box represents one of the text elements, and is defined by a height (font size), width (word, syllable, or character length), and trailing space (width of spaces following the word, syllable, or character). Next, the technique involves scanning downward through the paragraph cell and expanding the search tree to include nodes for boxes 2-N, where N is the number of boxes in the paragraph cell (90), as will now be described.

A node representing a line-start for a given baseline is expanded by producing one or more additional nodes for the next baseline. The line-starts for the next baseline imply a line-break for the preceding baseline. The preceding baseline may be above the present baseline, or simply precede it along that same line of text, e.g., when two or more baselines occupy the same line position within the paragraph due to placement of a graphic object. Thus, each node defines a line-start for a given baseline and is linked upward to a node defining a line-start for the preceding baseline.

Rather than consider every possible line-start and line-break combination as a node, the expansion is made sparsely by eliminating links that exceed a given penalty, i.e., nodes that define an undesirable line-break between two line starts. For example, if the line-start for baseline 1 is word 1, a line-start for baseline 2 at word 2 typically would leave excessive trailing white space between word 1 and the end of baseline 1. For this reason, the resulting node would be discarded based on the penalty function calculated for the preceding line, and not form part of the search tree.

Therefore, during the expansion process, the technique identifies nodes that produce excessive "link" penalties. In particular, the technique calculates a penalty for each node 2-N during expansion (92), and compares the calculated penalty to a maximum link penalty (94). A link penalty refers to the penalty created by breaking a line at the box associated with the node. Each line is defined by a line-start and a line-break. The line-break is the box immediately preceding the next line-start. Each line has a link penalty that is compared to a maximum link penalty to define a "break zone" for selection of a line-break and, as a result, the next line-start.

The break zone set by the maximum link penalty defines the line width that runs between the line break-point that produces the maximum penalty tolerated and the end of the pertinent baseline. Using the maximum link penalty, line breaks outside the break zone can be discarded from the outset. The link penalty can be calculated based on a number of features of the preceding line, such as in-line white space, hyphenations, and left-over white space at the end of the line of text that contribute to a visually displeasing appearance. Left-over white space refers to the amount of space between the end of the last box and the end of the applicable base line. Excessive "left-over" white space is generally undesirable, and is caused by breaking a line too "early," producing a very short line relative to the baseline width.

The "link" serves as a connection between a present node and a previous node in the search tree, each of which points to one of two consecutive line-starts, e.g., at lines three and four. The link between the present and previous node defines the line of text that starts with the box associated with the previous node and ends with the box just before the box associated with the present node. The link associates two consecutive line-starts with one another and, in effect, defines a line that extends between them. A series of links defines a downward sequence of the possible lines. The link penalty is distinguishable from an accrued penalty, which represents the sum of the link penalties calculated for each possible line in a particular downward sequence of possible lines.

The maximum link penalty can be established so that nodes that produce excessive link penalties, e.g., due to large amounts of left-over white space or hyphenations, can be discarded (96). In this manner, the technique "weeds out" intermediate sub-solutions that are unlikely to produce good overall solutions, reducing the solution set for the bottom-up pass to follow. This ensures that given lines within the paragraph that are too short or too long will not be added to the initial solution set. If the link penalty does not exceed the maximum penalty, the pertinent box is placed as a node in the search tree. Otherwise, the box is discarded and not placed as a node.

For a non-justified paragraph that is either left or center aligned, for example, the penalty calculation may involve consideration of the distance from the end of the line to the right edge of the paragraph shape for the applicable baseline, along with consideration of a hyphenation penalty. In this case, d represents the distance and H represents the hyphenation penalty. For the hyphenation penalty, H=0 if the possible line has no hyphen. In this example, if the line ends in a hyphenation: (1) H=C (a constant penalty for hyphenation) if there were no hyphenations in the previous three lines, (2) H=2*C if there was one hyphenation in the previous three lines, (3) H=4*C if there were two hyphenations in the previous three lines, and (4) 8*C if there were three hyphenations in the previous three lines. The penalty for the line can be expressed as $d^2+H$. The penalty for the paragraph is then the sum of the penalties of the lines.

For a justified paragraph, the penalty calculation may take into account, in addition to hyphenation, the number of spaces in each line that separate adjacent words or characters. For this example, s=number of spaces in the line. For all fully- and right-justified lines, the penalty can be calculated as $(d/s)^2+H$. Thus, the penalty units, for justified and non-justified text, can be proportional to a space in the text. For the last line, the penalty is always zero. The penalty of the paragraph is again the sum of the penalties of the lines in the paragraph. In either case, justified or non-justified, the link penalty is the penalty attributed to a particular line-start based on the penalty calculated for the preceding line.

Next, during expansion, the technique involves compiling downward sequences of possible lines within the paragraph, and calculating accrued link penalties over each downward sequence of lines extending from the top of the paragraph downward to each potential line-start node (98). In particular, upon consideration of each box for placement as a node, the technique sums the link penalties traced from the root node to that node. The technique compares the accrued link penalty to a benchmark penalty (100). The benchmark penalty represents the maximum acceptable accrued link penalty. As discussed above, the benchmark penalty can be derived from simple, conventional techniques for automated paragraph layout that produce a solution quickly, but not necessarily optimally. If the accrued link penalty for a particular node, and associated line sequence, is greater than the benchmark penalty, the entire line sequence from that node downward is pruned from the search tree (102). In this manner, identification of additional possible lines in that sequence is terminated.

Failure to satisfy the benchmark penalty at a given level within the search tree means that the accrued link penalty will only get worse as the search progresses. For this reason, the combination of nodes forming the line sequence is pruned from the solution set, avoiding further processing overhead and memory consumption in pursuit of a solution known to be a poor one. Each downward sequence, until it reaches the end of the paragraph, is only a partial paragraph layout solution. When the accrued penalty for one of the downward sequences does not satisfy the benchmark, further compilation of that sequence and expansion of the nodes for particular lines can be terminated. Thus, the technique involves building a complete paragraph layout solution by expanding the partial paragraph layout solutions, and comparing the penalty for the partial paragraph layout solution to the benchmark for a complete, but less than optimal, paragraph layout solution. Once the search tree is expanded, keeping in mind the maximum link penalty and pruning according to the benchmark penalty, a list of possible lines is produced as a solution set. Each possible line is defined by a line-start box recorded as a node in the tree. Each possible sequence of lines is defined by a series of line-start nodes that are linked with one another.

Figure 8:
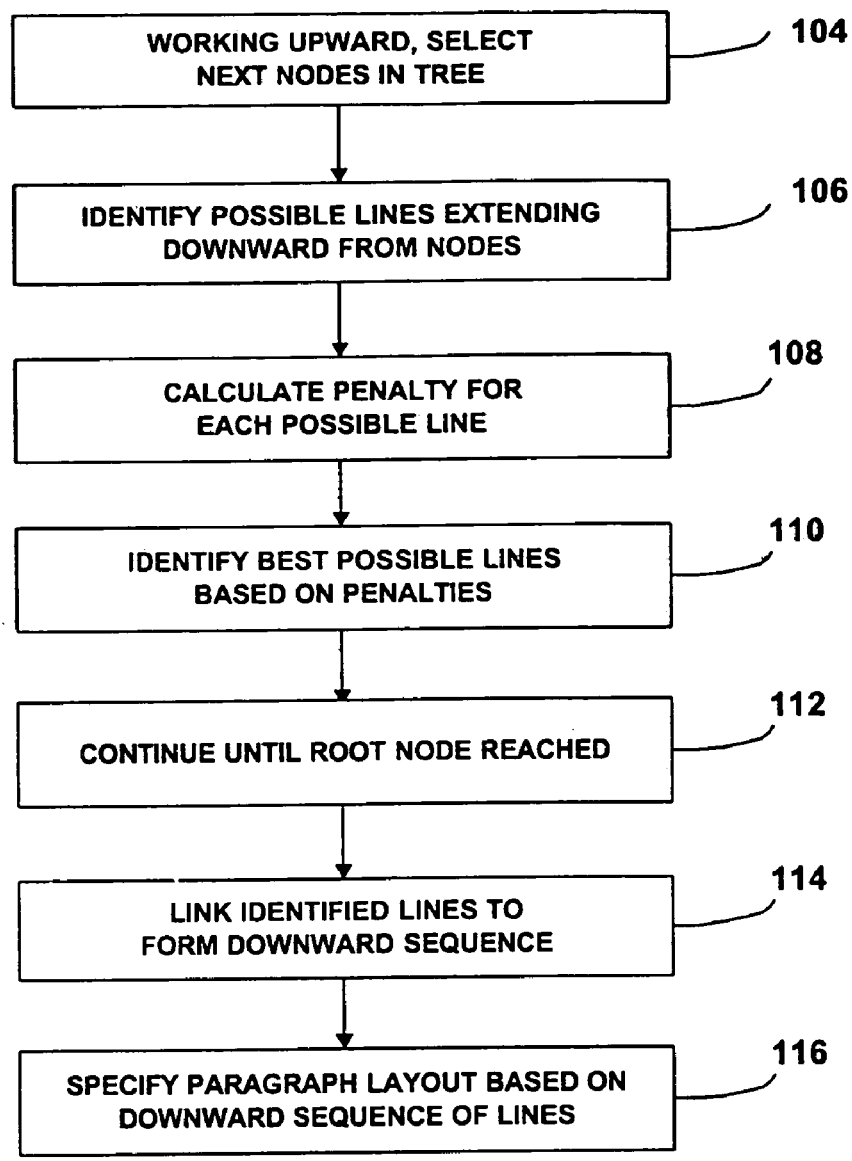
FIG. 8 is a flow diagram illustrating a bottom-up pass in the technique of FIG. 6.

FIG. 8 is a flow diagram illustrating a bottom-up pass in the technique of FIG. 6. The technique analyzes the list of possible lines generated in the top-down pass by working upward. In particular, the technique works upward, from the bottom of the search tree, and selects individual nodes (104). For each node, the technique identifies possible lines extending downward from the node (106). The technique then calculates the penalty for each of the possible lines (108), and identifies the optimal possible lines based on the penalties (110).

The process continues until the technique reaches the root node (112). At each level of the tree, i.e., for each baseline, the technique identifies the optimal possible lines extending downward from a given node. The technique links the optimal possible lines identified in this process to form a downward sequence (114), which serves as the optimal possible downward sequence in the solution set up to the present node in the tree. Then, the technique specifies a paragraph layout for the pertinent paragraph cell based on the identified downward sequence of lines (116). The technique renders the paragraph according to the specified paragraph layout, e.g., on monitor 16 or printer 22 for presentation to a user.

As a practical example, consider a paragraph with fifty words of equal length. Exactly 10 words fit within the width of an applicable baseline. However, the maximum link penalty can be set to permit consideration of other lines. For example, the maximum link penalty may be set to permit consideration of possible lines with only eight or nine words. The result would be three possible lines starting with the first word or other text element. The possible lines would include words one through eight, one through nine, and one through ten. For the next line, the top-down process would identify lines starting with words nine, ten, and eleven.

From determination of the first set of possible lines, it is clear that no lines can start with words two through seven. On this basis, the top-down process is able to "leapfrog" the paragraph, finding a small number of possible lines compared to the enormous number of line combinations tracked by other techniques. In the top-down process, the technique computes the link penalties for each of the possible lines and stores them for use in the bottom-up pass. Again, the bottom-up pass works upward, or "backward," from a last possible line. For each line, the technique accrues a penalty and identifies the optimal next line. The next optimal line is the line with the lowest possible total penalty from that line to the end of the paragraph.

This determination is done for each line, from the end to the beginning of the paragraph, tracking the total penalties for each of the next lines, i.e., those lines extending from the present line to the end of the paragraph, to find the "optimal" next line. In this manner, the automated paragraph layout technique renders a complete, global solution that takes into account all of the text and resulting lines in a paragraph, instead of just a subset. Advantageously, the global solution is rendered with the appearance of real time as the user makes changes to either the text or the cell.

For the line containing words one through ten, and assuming a baseline width of ten words, there are three possible next lines: eleven through eighteen, eleven through nineteen, and eleven through twenty. Because the process is working from bottom to top, the optimal penalty has already been determined for each of those next lines. After determining the optimal next line, the technique stores a reference to each of the optimal next lines for each line being processed.

If the optimal next line was the line containing words eleven through nineteen in this example, that line had the lowest total penalty of the three possible next lines, i.e., eleven through eighteen, eleven through nineteen, and eleven through twenty. In this case, the line containing words eleven through nineteen is marked as the optimal next line for the line above, which contains words one through ten.

The total penalty for the line with words one through ten then is calculated by adding the total penalty for the line with words eleven through nineteen to the penalty for the line with words one through ten. When the bottom-up pass is completed, the optimal possible combination can be easily found by following the next optimal line references until the end of the paragraph is reached. The resulting sequence of next optimal lines defines the paragraph layout.

To implement the top-down and bottom-up passes, the technique may be programmed to track boxes in the form of individual words, syllables, characters or other text units. In the top-down and bottom-up passes, the boxes maintain the same order as the original words in the paragraph and can be indexed by the letter position of the first letter in the box. One box may be generated as the end of the paragraph. The end of paragraph box is a zero-length box that immediately follows the box representing the last word of the paragraph.

The top-down pass produces a sparse tree of possible paragraph layouts, linking the boxes that start lines with the next possible line starts. The top-down pass may be very line-start centered in that it may infer line ends as the boxes that immediately precede a box associated with a line-start. The tree produced in the top down pass includes baseline-specific line start nodes with weighted links to subsequent line starts. The weight of the linkage between two line starts is the penalty, with larger values reflecting worse fit or appeal, for the line of text that starts with the box at the first line start and ends with the box that precedes the second line start.

The progression of the top-down pass can be expressed as follows. Given a paragraph of text, the technique measures all words in the paragraph to form the set of boxes that represents the words. The technique adds the first box as the first entry to the line-start tree. The first entry, box 1 at baseline 1, serves as the root node for the search tree. For "unvisited" nodes in the tree, i.e., nodes for which line and linkage penalties have not been calculated, the technique scans forward in the paragraph.

In particular, using the first unvisited node, the technique scans forward from the line-start's box in the array of boxes and finds possible line-starts that start the next line (and satisfy the maximum link penalty), at the next baseline, and adds those new nodes to the tree. The technique links the nodes with the penalty calculated for the line starting at the root node and running to, but not including, the current node. At this point, the tree has one root node, and weighted links to nodes for the other possible line starts.

Following pruning, a total penalty of zero is assigned to all end-of-paragraph line-start nodes for the bottom-up pass. In the bottom-up pass, for all "unvisited" nodes in the tree, using the last unvisited node, i.e., last in the order of their index number, the technique examines all of the linked "next line starts" below in the tree. The next line starts below in the tree are those that extend downward from the node presently being evaluated. The technique then adds the total penalty for each next line start with the associated link weight, i.e., the line penalty calculated in the top-down pass between the root node and the current node.

After calculating the total penalty, the technique compares each of the sums and selects the node linkage associated with the lowest sum as the optimal next line start. The technique then marks that particular linkage of nodes as the optimal for the pertinent line start. Moving upward in the tree, the technique continues for the next level of unvisited nodes, calculating the total penalty for line-starts from those nodes downward. At this point, the technique has assembled a tree of line start nodes and each line start node is associated with an optimal next node. From the top (root) node of the tree, the technique follows the optimal next nodes until it reaches the end-of-paragraph node. For example, if the root node was expanded into three nodes, one of them will be the best. From that best node at the second level of the tree, there will be a number of other nodes at the third level, one of which can be determined to be the best. The resulting path of best nodes followed by the technique defines the best total penalty and, hence, the optimal paragraph layout solution.

As described above with reference to FIG. 1, a program for paragraph layout in accordance with this specification may be implemented in digital electronic circuitry or in computer hardware, firmware, software, or in combinations of them, such as in a system 10. The computer program code may be tangibly embodied in a machine-readable storage device such as memory 18 or storage device 20 for execution by processor 12. Again, suitable processors include, by way of example, both general and special purpose microprocessors.

Generally, processor 12 will receive instructions and data from memory 18. Also, storage devices 20 suitable for tangibly embodying computer program instructions include all forms of non-volatile memory, including in addition to semiconductor memory devices, such as EPROM, EEPROM, and flash memory devices; magnetic disks such as an internal hard disk drive and removable disks such as magneto-optical disks, and CD-ROM disks, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. An automated paragraph layout method comprising:
   identifying a subset of possible lines within a paragraph in a top-down pass from the beginning to the end of the paragraph;
   calculating for each of the possible lines a respective line-specific penalty, the line-specific penalty for each line being calculated without reference to any penalty calculated for any other line;
   calculating a bottom-up accrued penalty for each of the possible lines in the subset of possible lines in a bottom-up pass from the end to the beginning of the paragraph, each bottom-up accrued penalty for a particular line being calculated from the line-specific penalties of the particular line and all the lines in an optimal sequence of lines from the particular line to the end of the paragraph, each bottom-up accrued penalty being calculated without reference to any penalty for any preceding line in the paragraph;
   selecting a combination of the possible lines based on the bottom-up accrued penalties of the possible lines; and
   specifying a layout for the paragraph according to the selected combination.

2. The method of claim 1, wherein each of the possible lines yields a downward sequence of possible lines, the method further comprising:
   calculating top-down accrued penalties over each of the downward sequences of the possible lines in the top-down pass from the beginning to the end of the paragraph, each top-down accrued penalty for a particular line in a given sequence of lines being calculated from the line-specific penalties of the particular line and all lines in the given sequence of lines from the beginning of the paragraph to the particular line; and
   before selecting the combination of the possible lines, excluding from the subset of possible lines the possible lines and associated sequences of possible lines for which the top-down accrued penalty does not satisfy a benchmark penalty.

3. The method of claim 2, further comprising:
   terminating identification of additional possible lines in the downward sequence associated with one of the possible lines in the event the top-down accrued penalty for the respective possible line does not satisfy the benchmark penalty.

4. The method of claim 1, wherein the line-specific penalty calculation for each of the possible lines includes penalties based on the width of the respective line relative to the width of an applicable baseline.

5. The method of claim 4, wherein the width of the applicable baseline varies between different baselines.

6. The method of claim 5, wherein the size of text within the different baselines varies.

7. The method of claim 1, wherein the paragraph is contained within a paragraph cell having an arbitrary shape.

8. A computer-readable medium carrying program code operable to cause a programmable processor to:
   identify a subset of possible lines within a paragraph in a top-down pass from the beginning to the end of the paragraph;
   calculate for each of the possible lines a respective line-specific penalty, the line-specific penalty for each line being calculated without reference to any penalty calculated for any other line;
   calculate a bottom-up accrued penalty for each of the possible lines in the subset of possible lines in a bottom-up pass from the end to the beginning of the paragraph, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph;
   select a combination of the possible lines based on the bottom-up accrued penalties of the possible lines; and
   specify a layout for the paragraph according to the selected combination.

9. The computer-readable medium of claim 8, wherein each of the possible lines yields a downward sequence of possible lines, and the program code is operable to cause a programmable processor to:
   calculate top-down accrued penalties over each of the downward sequences of the possible lines in the top-down pass from the beginning to the end of the paragraph, each top-down accrued penalty for a particular line in a given sequence of lines being calculated from the line-specific penalties of the particular line and all lines in the given sequence of lines from the beginning of the paragraph to the particular line; and before selecting the combination of the possible lines, exclude from the subset of possible lines the possible lines and associated sequences of possible lines for which the top-down accrued penalty does not satisfy a benchmark penalty.

10. The computer-readable medium of claim 9, wherein the program code is operable to cause a programmable processor to:

terminate identification of additional possible lines in the downward sequence associated with one of the possible lines in the event the top-down accrued penalty for the respective possible line does not satisfy the benchmark penalty.

11. The computer-readable medium of claim 8, wherein the line-specific penalty calculation for each of the possible lines includes penalties based on the width of the respective line relative to the width of an applicable baseline.

12. The computer-readable medium of claim 11, wherein the width of the applicable baseline varies between different baselines.

13. The computer-readable medium of claim 12, wherein the size of text within the different baselines varies.

14. The computer-readable medium of claim 1, wherein the paragraph is contained within a paragraph cell having an arbitrary shape.

15. A system comprising:

means for identifying a subset of possible lines within a paragraph in a top-down pass from the beginning to the end of the paragraph;

means of calculating for each of the possible lines a respective line-specific penalty, the line-specific penalty for each line being calculated without reference to any penalty calculated for any other line;

means of calculating a bottom-up accrued penalty for each of the possible lines in the subset of possible lines in a bottom-up pass from the end to the beginning of the paragraph, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph;

means for selecting a combination of the possible lines based on the bottom-up accrued penalties of the possible lines; and means for specifying a layout for the paragraph according to the selected combination.

16. The system of claim 15, wherein each of the possible lines yields a downward sequence of possible lines, the system further comprising:

means for calculating top-down accrued penalties over each of the downward sequences of the possible lines in the top-down pass from the beginning to the end of the paragraph, each top-down accrued penalty for a particular line in a given sequence of lines being calculated from the line-specific penalties of the particular line and all lines in the given sequence of lines from the beginning of the paragraph to the particular line; and means for excluding from the subset of the possible lines, before selecting the combination of the possible lines, the possible lines and associated sequences of possible lines for which the top-down accrued penalty does not satisfy a benchmark penalty.

17. The system of claim 16, further comprising:

means for terminating identification of additional possible lines in the downward sequence associated with one of the possible lines in the event the top-down accrued penalty for the respective possible line does not satisfy the benchmark penalty.

18. The system of claim 15, wherein the line-specific penalty calculation for each of the possible lines includes penalties based on the width of the respective line relative to the width of an applicable baseline.

19. The system of claim 18, wherein the width of the applicable baseline varies between different baselines.

20. The system of claim 19, wherein the size of text within the different baselines varies.

21. The system of claim 15, wherein the paragraph is contained within a paragraph cell having an arbitrary shape.

22. An automated paragraph layout method comprising:

identifying a subset of possible lines within a paragraph in a top-down pass through the paragraph, each of the possible lines yielding a downward sequence of additional possible lines;

calculating, in the top-down pass, a line-specific penalty for each of the possible lines, the line-specific penalty for each line being calculated without reference to any penalty calculated for any other line;

calculating top-down accrued penalties over each of the downward sequences of the possible lines in the top-down pass, each top-down accrued penalty for a particular line in a given sequence of lines being calculated from the line-specific penalties of the particular line and all lines in the given sequence of lines from the beginning of the paragraph to the particular line;

excluding from the subset of possible lines the possible lines and associated sequences of possible lines for which the top-down accrued penalty does not satisfy a benchmark penalty;

selecting a combination of possible lines remaining in the subset of possible lines in a bottom-up pass through the possible lines based on bottom-up accrued penalties accrued over upward sequences of the possible lines, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph; and specifying a layout for the paragraph according to the selected combination.

23. The method of claim 22, wherein the line-specific penalty calculation for each of the possible lines includes penalties based on the width of the respective line relative to the width of an applicable baseline.

24. The method of claim 23, wherein the width of the applicable baseline varies between different baselines.

25. A computer readable medium carrying program code operable to cause a programmable processor to:

identify a subset of possible lines within a paragraph in a top-down pass through the paragraph, each of the possible lines yielding a downward sequence of additional possible lines;

calculate, in the top-down pass, a line-specific penalty for each of the possible lines, the line-specific penalty for each line being calculated without reference to any penalty calculated for any other line;

calculate top-down accrued penalties over each of the downward sequences of the possible lines in the top-down pass, each top-down accrued penalty for a particular line in a given sequence of lines being calculated from the line-specific penalties of the particular line and all lines in the given sequence of lines from the beginning of the paragraph to the particular line;

exclude from the subset of possible lines the possible lines and associated sequences of possible lines for which the top-down accrued penalty does not satisfy a benchmark penalty;

select a combination of the possible lines remaining in the subset of possible lines in a bottom-up pass through the possible lines based on the bottom-up accrued penalties accrued over upward sequences of the possible lines, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph; and specify a layout for the paragraph according to the selected combination.

26. The computer-readable medium of claim 25, wherein the program code is operable to cause a programmable processor to:

terminate identification of additional possible lines in the downward sequence associated with one of the possible lines in the event the top-down accrued penalty for the respective possible line does not satisfy the benchmark penalty.

27. The computer-readable medium of claim 25, wherein the line-specific penalty calculation for each of the possible lines includes penalties based on the width of the respective line relative to the width of an applicable baseline.

28. The computer-readable medium of claim 25, wherein the width of the applicable baseline varies between different baselines.

29. A system comprising:

means for identifying a subset of possible lines within a paragraph in a top-down pass through the paragraph, each of the possible lines yielding a downward sequence of additional possible lines;

means for calculating, in the top-down pass, a line-specific penalty for each of the possible lines, the line-specific penalty for each line being calculated without reference to any penalty calculated for any other line;

means for calculating top-down accrued penalties over each of the downward sequence of the possible lines in the top-down pass from the beginning to the end of the paragraph, each top-down accrued penalty for a particular line in a given sequence of lines being calculated from the line-specific penalties of the particular line and all lines in the given sequence of lines from the beginning of the paragraph to the particular line;

means for excluding from the subset of possible lines the possible lines and associated sequences of possible lines for which the top-down accrued penalty does not satisfy a benchmark penalty;

means for selecting a combination of the possible lines remaining in the subset of possible lines in a bottom-up pass through the possible lines based on bottom-up accrued penalties accrued over upward sequences of the possible lines, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph; and means for specifying a layout for the paragraph according to the selected combination.

30. The system of claim 29, further comprising:

means for terminating identification of additional possible lines in the downward sequence associated with one of the possible lines in the event the top-down accrued penalty for the respective possible line does not satisfy the benchmark penalty.

31. The system of claim 29, wherein the line-specific penalty calculation for each of the possible lines includes penalties based on the width of the respective line relative to the width of an applicable baseline.

32. The system of claim 29, wherein the width of the applicable baseline varies between different baselines.

33. An automated paragraph layout method comprising:

defining a paragraph cell for layout of a paragraph, the paragraph cell including a sequence of baselines for placement of lines of text information, wherein at least some of the baselines have different widths;

identifying a subset of possible lines within the paragraph in a top-down pass through the paragraph, each of the possible lines being characterized by a line-start and yielding a downward sequence of additional possible lines at the baselines within the paragraph;

calculating, in the top-down pass, a line-specific penalty for each of the possible lines, the line specific penalty for each line being calculated without reference to any penalty calculated for any other line;

calculating top-down accrued penalties over each of the downward sequences of the possible lines in the top-down pass through the paragraph, each top-down accrued penalty for a particular line in a given sequence of lines being calculated from the line-specific penalties of the particular line and all lines in the given sequence of lines from the beginning of the paragraph to the particular line;

excluding from the subset of possible lines the possible lines and associated downward sequences of possible lines for which the top-down accrued penalty does not satisfy a benchmark penalty;

selecting a combination of possible lines remaining in the subset of possible lines in a bottom-up pass through the possible lines based on bottom-up accrued penalties accrued over upward sequences of the possible line, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph; and specifying a layout for the paragraph according to the selected combination.

34. A computer readable medium carrying program code operable to cause a programmable processor to:

define a paragraph cell for layout of a paragraph, the paragraph cell including a sequence of baselines for placement of lines of text information, wherein at least some of the baselines have different widths;

identify a subset of possible lines within the paragraph in a top-down pass through the paragraph, each of the possible lines being characterized by a line-start and yielding a downward sequence of additional possible lines at the baselines within the paragraph;

calculate, in the top-down pass, a line-specific penalty for each of the possible lines, the line specific penalty for each line being calculated without reference to any penalty calculated for any other line;

calculate top-down accrued penalties over each of the downward sequences of the possible lines in the top-down pass through the paragraph, each top-down accrued penalty for a particular line in a given sequence of lines being calculated from the line-specific penalties of the particular line and all lines in the given sequence of lines from the beginning of the paragraph to the particular line;

exclude from the subset of possible lines the possible lines and associated downward sequences of possible lines for which the top-down accrued penalty does not satisfy a benchmark penalty;

select a combination of the possible lines remaining in the subset of possible lines in a bottom-up pass through the possible lines based on bottom-up accrued penalties accrued over upward sequences of the possible lines, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph; and specify a layout for the paragraph according to the selected combination.

35. An automated paragraph layout method comprising:

defining a paragraph layout for a paragraph of text, including:

identifying a subset of possible lines within a paragraph in a top-down pass from the beginning to the end of the paragraph;

calculating for each of the possible lines a respective line-specific penalty, the line-specific penalty for each line being calculated without reference to any penalty calculated for any other line;

calculating a bottom-up accrued penalty for each of the possible lines in the subset of possible lines in a bottom-up pass from the end to the beginning of the paragraph, each bottom-up accrued penalty for a particular line being calculating from the line-specific penalties of the particular line and all lines in an optimal sequence of lines from the particular line to the end of the paragraph, each bottom-up accrued penalty being calculated without reference to any penalty for any preceding line in the paragraph;

selecting a combination of the possible lines based on the bottom-up accrued penalties of the possible lines; and specifying a layout for the paragraph according to the selected combination;

detecting a change to the paragraph of text, wherein the change includes at least one of a change to the text and a change to a paragraph cell in which the text was positioned; and redefining the paragraph layout in real time in response to the detected change, including:

recalculating line-specific penalties only for lines that change as a result of the change to the paragraph of text;

calculating a bottom-up accrued penalty for each of the possible lines in the subset of possible lines in a bottom-up pass from the end to the beginning of the paragraph, each bottom-up accrued penalty for a particular line being calculated form the line-specific penalties of the particular line and all lines in an optimal sequence of lines from the particular line to the end of the paragraph, each bottom-up accrued penalty being calculated without reference to any penalty for any preceding line in the paragraph;

selecting a combination of the possible lines based on the bottom-up accrued penalties of the possible lines; and specifying a layout for the paragraph according to the selected combination.

36. The method of claim 35, wherein the change includes at least one of an addition, deletion, and modification of the text.

37. The method of claim 35, wherein the change includes at least one of a change in the size and shape of the paragraph cell.

38. The method of claim 35, wherein the change includes at least one of the addition, deletion, and modification of imagery within the paragraph cell.

39. A computer readable medium carrying program code operable to cause a programmable processor to:

define a paragraph layout for a paragraph of text, including code operable to cause a programmable processor to:

identify a subset of possible lines within a paragraph in a top-down pass from the beginning to the end of the paragraph;

calculate for each of the possible lines a respective line-specific penalty, the line-specific penalty for each line being calculated without reference to any penalty calculated for any other line;

calculate a bottom-up accrued penalty for each of the possible lines in the subset of possible lines in a bottom-up pass from the end to the beginning of the paragraph, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph;

select a combination of the possible lines based on the bottom-up accrued penalties of the possible lines; and specify a layout for the paragraph according to the selected combination;

detect a change to the paragraph of text, wherein the change includes at least one of a change to the text and a change to a paragraph cell in which the text is positioned; and redefine the paragraph layout in real time in response to the detected change, including code operable to cause a programmable processor to:

recalculate line-specific penalties only for lines that change as a result of the change to the paragraph of text;

calculate a bottom-up accrued penalty for each of the possible lines in the subset of possible lines in a bottom-up pass from the end to the beginning of the paragraph, each bottom-up accrued penalty for a particular line being calculated from the line-specific penalties of the particular line and all lines in an optimal sequence of lines from the particular line to the end of the paragraph, each bottom-up accrued penalty being calculated without reference to any penalty for any preceding line in the paragraph;

select a combination of the possible lines based on the bottom-up accrued penalties of the possible lines; and specify a layout for the paragraph according to the selected combination.

40. The computer readable medium of claim 39, wherein the change includes at least one of an addition, deletion, and modification of the text.

41. The computer readable medium of claim 39, wherein the change includes at least one of a change in the size and shape of the paragraph cell.

42. The computer readable medium of claim 39, wherein the change includes at least one of the addition, deletion, and modification of imagery within the paragraph cell.

* * * * *

UNITED STATES PATENT AND TRADEMARK OFFICE
CERTIFICATE OF CORRECTION

PATENT NO. : 6,948,119 B1
DATED : September 20, 2005
INVENTOR(S) : John L. Farmer et al.

It is certified that error appears in the above-identified patent and that said Letters Patent is hereby corrected as shown below:

Column 19,
Line 57, delete "was" and replace with -- is --;

Column 20,
Line 1, delete "form" and replace with -- from --.

Signed and Sealed this

Twentieth Day of December, 2005

JON W. DUDAS
*Director of the United States Patent and Trademark Office*